(12) United States Patent
Yan

(10) Patent No.: US 12,238,561 B2
(45) Date of Patent: Feb. 25, 2025

(54) METHOD AND DEVICE FOR REPORTING UE INFORMATION, METHOD AND DEVICE FOR PROCESSING UE INFORMATION, AND MEDIUM

(71) Applicant: DATANG MOBILE COMMUNICATIONS EQUIPMENT CO., LTD., Beijing (CN)

(72) Inventor: Nan Yan, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 274 days.

(21) Appl. No.: 17/630,886

(22) PCT Filed: Jul. 7, 2020

(86) PCT No.: PCT/CN2020/100663
§ 371 (c)(1),
(2) Date: Jan. 27, 2022

(87) PCT Pub. No.: WO2021/017774
PCT Pub. Date: Feb. 4, 2021

(65) Prior Publication Data
US 2022/0272559 A1     Aug. 25, 2022

(30) Foreign Application Priority Data
Jul. 29, 2019 (CN) .......................... 201910689393.4

(51) Int. Cl.
*H04W 24/10* (2009.01)
*H04W 76/27* (2018.01)

(52) U.S. Cl.
CPC .......... *H04W 24/10* (2013.01); *H04W 76/27* (2018.02)

(58) Field of Classification Search
None
See application file for complete search history.

(56) References Cited

U.S. PATENT DOCUMENTS 9,113,378 B2 * 8/2015 Takahashi ......... H04W 36/0033
2017/0231011 A1 * 8/2017 Park .................. H04W 72/0446
(Continued)

FOREIGN PATENT DOCUMENTS

CN     105101256 A    11/2015
CN     105722213 A     6/2016
(Continued)

OTHER PUBLICATIONS

Google machine English translation of CN111294823A (Year: 2018).*
(Continued)

*Primary Examiner* — Kenny S Lin
(74) *Attorney, Agent, or Firm* — Ladas & Parry, LLP

(57) ABSTRACT

A reporting and processing method, device, apparatus and medium for User Equipment information are provided. The method includes: recording UE information, by a UE, the UE information comprises one or a combination of the following information: secondary node information, secondary cell information, beam information, cell-level measurement result information, beam-level measurement result information, historical information of the UE in an inactive state; reporting the UE information by the UE.

20 Claims, 4 Drawing Sheets

(56) References Cited

U.S. PATENT DOCUMENTS

| | | | |
|---|---|---|---|
| 2018/0302914 A1* | 10/2018 | da Silva | H04W 76/27 |
| 2018/0359790 A1 | 12/2018 | Ingale et al. | |
| 2018/0368205 A1* | 12/2018 | Park | H04W 76/30 |
| 2019/0053193 A1* | 2/2019 | Park | H04W 72/51 |
| 2019/0132777 A1 | 5/2019 | Park et al. | |
| 2019/0141592 A1* | 5/2019 | Park | H04B 7/0695 |
| 2019/0373442 A1 | 12/2019 | Kim | |
| 2021/0068186 A1 | 3/2021 | Wu | |
| 2021/0219160 A1* | 7/2021 | Xie | H04W 24/10 |
| 2022/0078646 A1* | 3/2022 | Xu | H04W 76/15 |
| 2024/0063883 A1* | 2/2024 | Zheng | H04B 7/088 |

FOREIGN PATENT DOCUMENTS

| | | | | |
|---|---|---|---|---|
| CN | 106911925 A | | 6/2017 | |
| CN | 107249221 A | | 10/2017 | |
| CN | 109151921 A | | 1/2019 | |
| CN | 109391998 A | | 2/2019 | |
| CN | 109756924 A | | 5/2019 | |
| CN | 110022224 A | | 7/2019 | |
| CN | 111294823 A | * | 6/2020 | H04W 24/02 |
| EP | 3179762 A1 | | 6/2017 | |
| EP | 3063966 B1 | | 3/2019 | |
| EP | 3817425 A1 | * | 5/2021 | H04L 5/001 |
| WO | 2013115532 A1 | | 8/2013 | |
| WO | 2018155918 A1 | | 8/2018 | |
| WO | 2019088905 A1 | | 5/2019 | |
| WO | 2019096162 | | 5/2019 | |
| WO | 2019126917 A1 | | 7/2019 | |
| WO | 2012064250 A1 | | 5/2021 | |
| WO | WO-2022083411 A1 | * | 4/2022 | H04W 24/04 |

OTHER PUBLICATIONS

Extended European Search Report for European Patent Application 20847639.0 provided by the European Patent Office on Sep. 7, 2022.

International Search Report for PCT Application PCT/CN2020/100663 issued on Sep. 28, 2020, and its English Translation provided by WIPO.

Written Opinion for PCT Application PCT/CN2020/100663 issued on Sep. 28, 2020, and its English Translation provided by WIPO.

Internationally Preliminary Report on Patentability for PCT/CN2020/100663 issued on Feb. 1, 2022 and English translation provided by WIPO.

First Chinese Office Action and search report for Chinese Patent Application 201910689393.4, issued on Sep. 1, 2021 with English translation provided by client.

Second Chinese Office Action for Chinese Patent Application 201910689393.4, issued on Sep. 1, 2021 with English translation provided by client.

Office Action in the corresponding EP patent Application No. 20847639.0, issued on Oct. 8, 2024.

* cited by examiner

METHOD AND DEVICE FOR REPORTING UE INFORMATION, METHOD AND DEVICE FOR PROCESSING UE INFORMATION, AND MEDIUM

CROSS-REFERENCE TO RELATED APPLICATIONS

This application is the U.S. national phase of PCT Application PCT/CN2020/100663 filed on Jul. 7, 2020, which claims priority to the Chinese Patent Application No. 201910689393.4 filed in China on Jul. 29, 2019, the disclosures of which are incorporated herein by reference in their entireties.

TECHNICAL FIELD

The present disclosure relates to the field of wireless communication technology, and more particularly, to a method and a device for reporting UE information, a method and a device for processing UE information and a medium.

BACKGROUND

First, here is a brief illustration of the historical information record and the report scheme for Long Term Evolution (LTE) (E-UTRA, Evolution-Universal Terrestrial Radio Access Network) User Equipment (UE).
(1.1) Recording A UE's historical information could include related information of one or more cells the UE camps on or accesses to, every cell information is an independent entry. When a UE switches primary cell (PCell) (for connected state)/serving cell (for idle state), it enters to other Radio Access Technology (RAT) or no service state, the information of previous cells recorded by the UE is as followed:

The identify information of cells: if a cell global identifier (CGI) is available, the CGI is recorded; or, identifying the cell using frequency point and a physical cell identity (PCI).

The time spent UE camping on/accessing to the cell.

When a UE accesses to a E-UTRA (connected state or idle state), while the UE is in a no service state or accesses to/camps on other RAT, the information recorded by the UE is as followed:

An entry only includes the time spent the UE is in a no service state/accesses to/camps on other RAT, excluding specific cell information record.

UE historical information maintained by a UE of LTE UE includes records of idle state and connected state A UE saves at most 16 UE historical information entries, each entry could be cell information or no service information/other RAT information. When a UE stores the maximum number of entries, the entries stored the longest time needed to be deleted, ensuring that the number of entries of UE does not exceed the maximum limit.
(1.2) Reporting A UE could indicate and report to a network side after being equipped with the ability of storing UE historical information and storing UE historical information. During the process of Radio Resource Control (RRC) (connection) establishment or RRC (connection) recovery, a UE could report 1 bit indication information. After a network receives the indication, it could inform the UE to report using UE InformationRequest/Response and receive the specific historical information content reported by the UE.

Disadvantages in the related art include: there is only primary cell related information in the current UE historical information records, such information is no longer suitable for communication scenarios in related art.

SUMMARY

A method and a device for reporting UE information, a method and a device for processing UE information and a medium are provided in the present disclosure, so as to solve the problem that UE information cannot be applied to scenarios of new properties.

A method for reporting User Equipment (UE) information is provided in the present disclosure, including:
recording, by a UE, UE information, where the UE information includes one or a combination of the following information: secondary node information, secondary cell information, beam information, cell-level measurement result information, beam-level measurement result information, historical information of the UE in an inactive state;
reporting the UE information by the UE.
Optionally, the secondary node information includes a secondary node identifier and/or UE access time.
Optionally, the secondary node identifier is an identifier of a Primary Secondary Cell (PSCell) which the secondary node accesses to for the UE.
Optionally, the PSCell identifier is a Cell Global Identifier (CGI) or a frequency point+Physical Cell Identifier (PCI).
Optionally, the secondary cell information includes a cell identifier and/or UE access time.
Optionally, the secondary cell identifier is a frequency point which the secondary cell accesses to +PCI.
Optionally, when a UE is in a connected state and connected to a NR node, and there are beams divisions in corresponding cells, the recorded beam information is beam information of a primary cell and/or a secondary cell of a master node (MN), and/or, beam information of a primary cell and/or a secondary cell of a secondary node (SN); or, when UE is in an idle state or inactive state, camping on a NR cell, and there are beams divisions in the cell, the recorded beam information is beam information of a cell which the UE camps on.
Optionally, the beam information includes one or a combination of following information: beams index, time of accessing to each beam for the UE, time of camping on each beam for the UE.
Optionally, the cell-level measurement result information includes one or a combination of following information:
a cell identifier, UE access time, camping time of the UE, an optimal measurement result during access of the UE, an optimal measurement result during camping of the UE, time when the optimal measurement result appears during access of the UE, time when the optimal measurement result appears during camping of the UE.
Optionally, the beam-level measurement result information includes one or a combination of following information:
a cell identifier, a beam identifier, time of accessing to beams for the UE, time of camping on beams for the UE, an optimal measurement result during accessing to beams for the UE, an optimal measurement result during camping on beams for the UE, time when the optimal measurement result appears during accessing to beams for the UE, time when the optimal measurement result appears during camping on beams for the UE.

Optionally, the historical information of the UE in an inactive state is behavior information of the UE in an inactive state.

A method for processing User Equipment (UE) information is provided in the present disclosure, including:
- receiving UE information reported by a UE, the UE information includes one or a combination of following information: secondary node information, secondary cell information, beam information, cell-level measurement result information, beam-level measurement result information, historical information of the UE in an inactive state;
- determining a state of the UE according to the UE information.

Optionally, the secondary node information includes a secondary node identifier and/or UE access time.

Optionally, the secondary node identifier is an identifier of a Primary Secondary Cell (PSCell) which the secondary node accesses to for the UE.

Optionally, the Primary Secondary Cell (PSCell) identifier is a Cell Global Identifier (CGI) or a frequency point+ Physical Cell Identifier (PCI).

Optionally, the secondary cell information includes a cell identifier and/or UE access time.

Optionally, the secondary cell identifier is a frequency point which the secondary cell accesses to +PCI.

Optionally, when a UE is in a connected state and connected to a NR node, and there are beams divisions in corresponding cells, the recorded beam information is beam information of primary cell and/or secondary cell of a master node (MN), and/or, beam information of primary cell and/or secondary cell of a secondary node (SN); or,
- when UE is in an idle state or inactive state, camping on a NR cell, and there are beams divisions in the cell, the recorded beam information is beam information of the cell which the UE camps on.

Optionally, the beam information includes one or a combination of following information: a beams index, time of accessing to each beam for the UE, time of camping on each beam for the UE.

Optionally, the cell-level measurement result information includes one or a combination of following information:
- a cell identifier, UE access time, camping time of the UE, an optimal measurement result during access of the UE, an optimal measurement result during camping of the UE, time when the optimal measurement result appears during access of the UE, time when the optimal measurement result appears during camping of the UE.

Optionally, the beam-level measurement result information includes one or a combination of following information:
- a cell identifier, a beam identifier, time of accessing to beams for the UE, time of camping on beams for the UE, an optimal measurement result during accessing to beams for the UE, an optimal measurement result during camping on beams for the UE, time when the optimal measurement result appears during accessing to beams for the UE, time when the optimal measurement result appears during camping on beams for the UE.

Optionally, the historical information of the UE in an inactive state is behavior information of the UE in an inactive state.

A user equipment is further provided in the present disclosure, including:
- a processor, configured to read programs stored in a memory to perform:
- recording UE information, where the UE information includes one or a combination of following information: secondary node information, secondary cell information, beam information, cell-level measurement result information, beam-level measurement result information, historical information of the UE in an inactive state;
- a transceiver, configured to receive and transmit data controlled by the processor to perform:
- reporting the UE information.

Optionally, the secondary node information includes a secondary node identifier and/or UE access time.

Optionally, the secondary node identifier is an identifier of a Primary Secondary Cell (PSCell) which the secondary node accesses to by a UE.

Optionally, the Primary Secondary Cell (PSCell) identifier is a Cell Global Identifier (CGI) or a frequency point+ Physical Cell Identifier (PCI).

Optionally, the secondary cell information includes a cell identifier and/or UE access time.

Optionally, the secondary cell identifier is a frequency point which the secondary cell accesses to +PCI.

Optionally, when a UE is in a connected state and connected to a NR node, and there are beams divisions in corresponding cells, the recorded beam information is beam information of a primary cell and/or a secondary cell of a master node (MN), and/or, beam information of a primary cell and/or a secondary cell of a secondary node (SN); or,
- when UE is in an idle state or inactive state, camping on a NR cell, and there are beams divisions in the cell, the recorded beam information is beam information of a cell which the UE camps on.

Optionally, the beam information includes one or a combination of following information: beams index, time of accessing to each beam for the UE, time of camping on each beam for the UE.

Optionally, the cell-level measurement result information includes one or a combination of following information:
- a cell identifier, UE access time, camping time of the UE, an optimal measurement result during access of the UE, an optimal measurement result during camping of the UE, time when the optimal measurement result appears during access of the UE, time when the optimal measurement result appears during camping of the UE.

Optionally, the beam-level measurement result information includes one or a combination of following information:
- a cell identifier, a beam identifier, time of accessing to beams for the UE, time of camping on beams for the UE, an optimal measurement result during accessing to beams for the UE, an optimal measurement result during camping on beams for the UE, time when the optimal measurement result appears during accessing to beams for the UE, time when the optimal measurement result appears during camping on beams for the UE.

Optionally, historical information of the UE in an inactive state is behavior information of the UE in an inactive state.

A base station is further provided in the present disclosure, including:
- a processor, configured to read programs stored in a memory to perform:
- determining a state of a UE according to UE information;
- a transceiver, configured to receive and transmit data controlled by a processor to perform:
- receiving UE information reported by a UE, the UE information includes one or a combination of following information: secondary node information, secondary cell information, beam information, cell-level measurement result information, beam-level measurement result information, historical information of the UE in an inactive state.

Optionally, the secondary node information includes a secondary node identifier and/or UE access time.

Optionally, the secondary node identifier is an identifier of a Primary Secondary Cell (PSCell) which the secondary node accesses to for the UE.

Optionally, the Primary Secondary Cell (PSCell) identifier is a Cell Global Identifier (CGI) or a frequency point+ Physical Cell Identifier (PCI).

Optionally, the secondary cell information includes cell identifier and/or UE access time.

Optionally, the secondary cell identifier are frequency point which the secondary cell accesses to +PCI.

Optionally, when a UE is in a connected state and connected to a NR node, and there are beams divisions in corresponding cells, the recorded beam information is beam information of primary cell and/or secondary cell of a master node (MN), and/or, beam information of primary cell and/or secondary cell of a secondary node (SN); or,
  when UE is in an idle state or inactive state, camping on a NR cell, and there are beams divisions in the cell, the recorded beam information is beam information of the cell which the UE camps on.

Optionally, the beam information includes one or a combination of following information: beams index, time of accessing to each beam for the UE, time of camping on each beam for the UE.

Optionally, the cell-level measurement result information includes one or a combination of following information:
  a cell identifier, UE access time, camping time of the UE, an optimal measurement result during access of the UE, an optimal measurement result during camping of the UE, time when the optimal measurement result appears during access of the UE, time when the optimal measurement result appears during camping of the UE.

Optionally, the beam-level measurement result information includes one or a combination of following information:
  a cell identifier, a beam identifier, time of accessing to beams for the UE, time of camping on beams for the UE, an optimal measurement result during accessing to beams for the UE, an optimal measurement result during camping on beams for the UE, time when the optimal measurement result appears during accessing to beams for the UE, time when the optimal measurement result appears during camping on beams for the UE.

Optionally, historical information of the UE in an inactive state is behavior information of the UE in an inactive state.

A device for reporting UE information is further provided in the present disclosure, including:
  a recording module, configured to record UE information, where the UE information includes one or a combination of following information: secondary node information, secondary cell information, beam information, cell-level measurement result information, beam-level measurement result information, historical information of the UE in an inactive state;
  a reporting module, configured to report the UE information.

A processing apparatus for UE information is further provided in the present disclosure, including:
  a receiving module, configured to receive UE information reported by a UE, the UE information includes one or a combination of following information: secondary node information, secondary cell information, beam information, cell-level measurement result information, beam-level measurement result information, historical information of the UE in an inactive state;
  a determining module, configured to determine a state of a UE according to the UE information.

A computer-readable storage medium is further provided in the present disclosure, where a computer program is stored in the computer-readable storage medium to perform the method for reporting UE information hereinabove, or the method for processing UE information hereinabove. The beneficial effects of the present disclosure are as follows:

According to the embodiments of the present disclosure, the UE not only records and reports primary cell related information any more, but also expand context information of the UE, to adapt to the use of a variety of scenarios with new properties, such as Multi/Dual-Connectivity scenarios or carrier aggregation scenarios, etc., so as to adapt to requirements of scenarios with new properties of communication in related fields better.

Further, according to the embodiments of the present disclosure, since UE information is expanded, so that it assists a network side to determine the path, velocity and geographical locations of UE, or assists a network side to configure secondary nodes and/or secondary cells for the UE according to historical information.

BRIEF DESCRIPTION OF THE DRAWINGS

Accompanying drawings described herein are configured to provide further understanding of the present disclosure and constitute a part of the present disclosure. Illustrative embodiments of the present disclosure and descriptions thereof are configured to explain the present disclosure, and do not constitute any improper limitation on the present disclosure.

DETAILED DESCRIPTION

The inventor noticed in the process of inventing:
Some of the scenarios with new properties appearing in current communication systems are described below.
MC (Multiple Connection)

Figure 1:
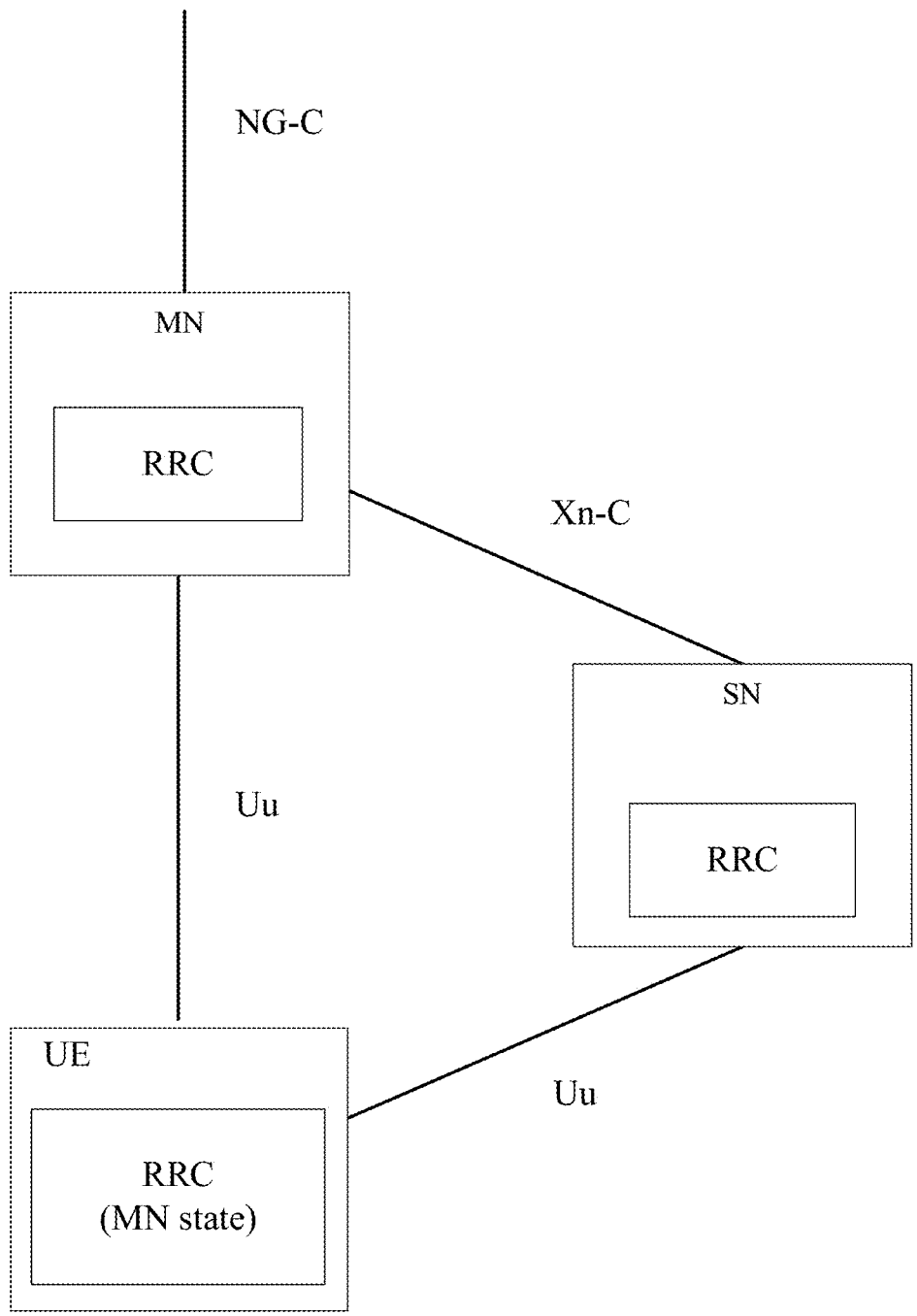
FIG. 1 is a schematic diagram of a MR-DC control plane connecting to 5GC in some embodiments of the present disclosure.

FIG. 1 is a schematic diagram of a MR-DC (Multi-RAT Dual Connectivity) control plane connecting to 5GC, Dual Connectivity is shown in the figure. In Multiple connection structure, a UE may connects to a MN (Master Node) and one or more SNs (Secondary Node), and a UE perform signaling and/or data interaction with these network nodes, Both MN and SN could be LTE/e-LTE/NR node. When there are a MN and a SN, it is called DC (Dual connection).

When a UE is in a connected state, it could connect to one or more network side nodes which are in one or more RAT. For example, when a MN is a LTE node and a SN is a NR node, it is a (NG) EN-DC dual connection; when a MN is a NR node and a SN is a LTE node, it is a NE-DC dual connection; when both a MN and a SN are NR nodes, it is a NR-NR-DC.

2. CA (Carrier Aggregation)

In order to achieve faster transmission rate, LTE systems introduce carrier aggregation technology, whereby a UE connects to multiple cells at the same time, which share a MAC (Media Access Control) layer and are uniformly scheduled by the network. The cell connected with control plane is PCell (Primary cell), other cells only performing data transmission are SCell (Secondary cell).

3. NR RRC Inactive State

Figure 2:
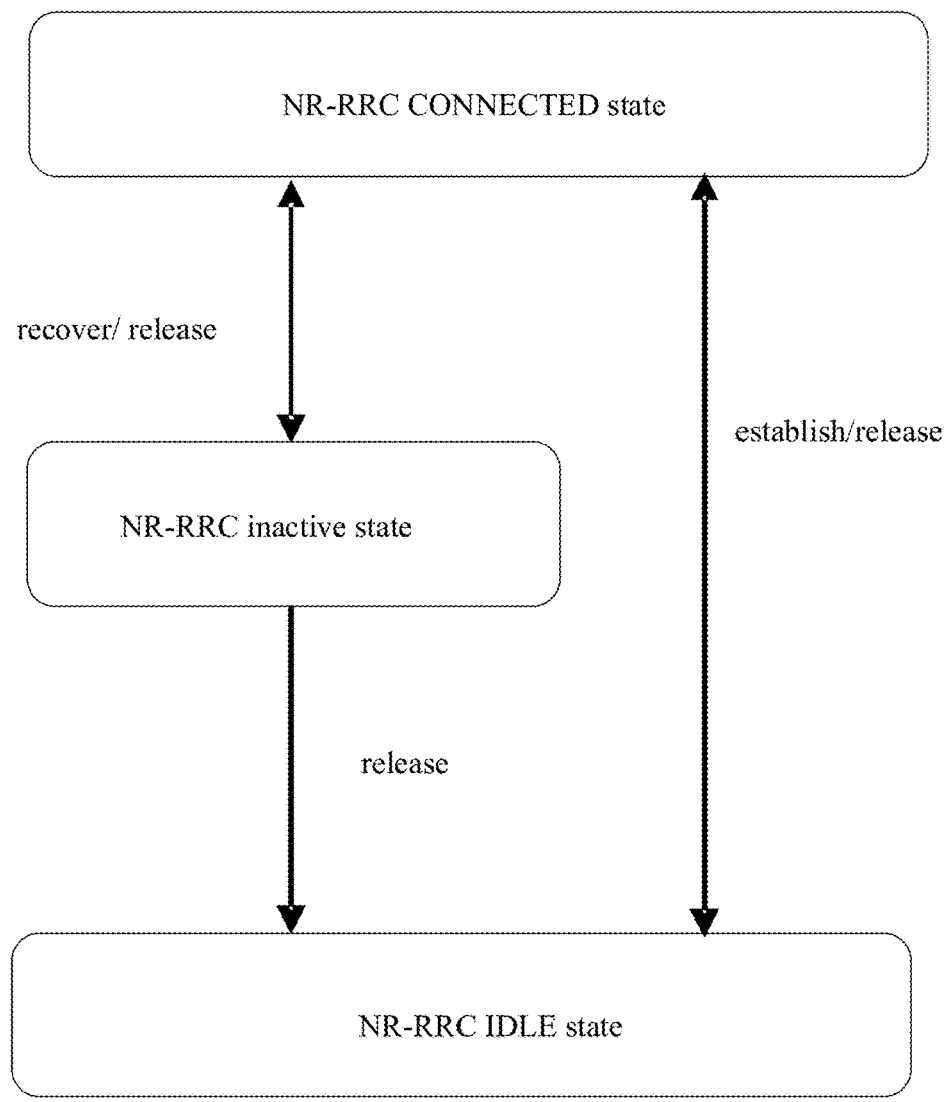
FIG. 2 is a schematic diagram of a relationship of UE state in some embodiments of the present disclosure.

FIG. 2 is a schematic diagram of a relationship of UE state. As is shown in the figure, in LTE wireless technology, a terminal only has RRC IDLE state and RRC CONNECTED state. A base station could know cells users camping on and camping time, RRC inactive state is newly added in NR New Radio. A UE could transform between three states under instructions of network or after a non-connection satisfies some conditions, Transforming to an inactive state from an IDLE state directly is not supported currently.

In an inactive state, the radio connection between a UE and a base station is disconnected, but the connection between a UE and a core network node is maintained, Both of a UE and a base station stores UE context information. In this state, behaviors of a UE is similar to behaviors of a UE in a IDLE state. It can perform reading systems information, cell re-selection and other behaviors. But if a UE is removed from a RAN area (RAN: Radio Access Network), performing a RAN update to update a RAN area.

4. Beam

Physical layers defines SSB (Synchronization Signal Block) for synchronization and reading main information Blocks. Each beam corresponds to an SSB index. A UE determines a current optimal beam through obtaining SSBs.

From the above scenarios with new properties, there is only primary cell related information, used for statistics and prediction of paths and velocity of a UE for a network side in records of current UE historical information. However, no information has been recorded for scenarios with new properties such as multiple/dual connection scenarios or carrier aggregation. Recording the information can help a network side to determine position of a UE, serving cells and to configure related cell-level/beam-level parameters better. In other words, even if records of current UE historical information can also be applied to come complex scenarios, but because of the addition of scenarios with new properties, applications of current method cannot further optimize communication networks according to these complex scenarios with new properties, so further enhancing records of UE information according to new properties is needed.

Based on this, some embodiments of the present disclosure provide a recording and reporting method for UE historical information. Recording and reporting historical information of secondary nodes and secondary cells, providing a network with UE historical information related to MC or CA scenario base on a primary cell to further assist a network side to determine position of a UE, serving cells and to configure related cell-level/beam-level parameters, The specific embodiments of the present disclosure will be described below with reference to the accompanying drawings.

Description of implementations at a UE side, a base station side will be explained respectively, and then an example for cooperation of the UE and the base station will be given to better understand the implementations given in some embodiments of the present disclosure. This way of explanation does not mean that implementations of the UE and the base station must be executed in cooperation or separately. In fact, when implementations of the UE and the base station are separately, problems related to the UE and the base station are addressed individually, and if the implementations of the UE and the base station side are used in cooperation, better technical effects will be obtained.

Figure 3:
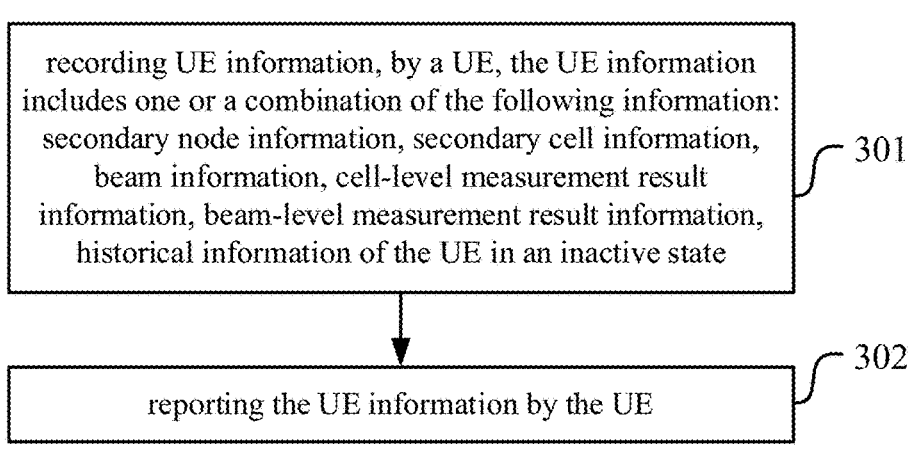
FIG. 3 is a schematic diagram of an implementation process of a reporting method of a UE side in some embodiments of the present disclosure.

FIG. 3 is a schematic diagram of an implementation process of a reporting method of a UE side in some embodiments of the present disclosure, as is shown in the figure, including:

step 301: recording UE information, by a UE, the UE information includes one or a combination of the following information: secondary node information, secondary cell information, beam information, cell-level measurement result information, beam-level measurement result information, historical information of the UE in an inactive state;

step 302: reporting the UE information by the UE.

In the embodiments of the present disclosure, information related to nodes and cells can provide paths information, information related to beams can provide direction information. The UE information can also be classified to position information, as all of them can indicate positions of cell-level, directions of beam-level in cells, velocity, directions of motion, etc. Historical information of the UE in an inactive state can provide moving position information of the UE.

For example: the secondary node information can provide a network side with position information of the UE, the secondary cell information can provide a network side with position information of the UE, the beam information can provide a network side with directions of motion of the UE, the cell-level measurement result information can provide a network side with path information of the UE, the beam-level measurement result information can provide a network side with path information of the UE, the historical information of the UE in an inactive state can provide moving information of the UE.

Figure 4:
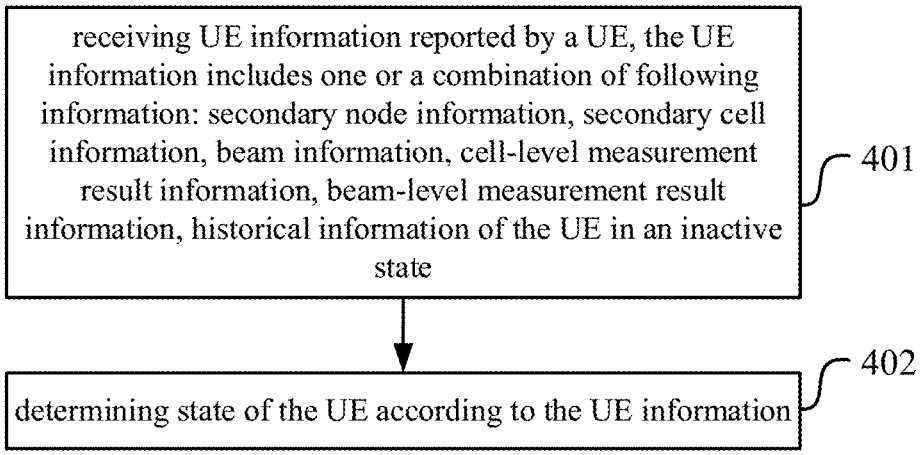
FIG. 4 is a schematic diagram of an implementation process of a processing method of a network side in some embodiments of the present disclosure.

FIG. 4 is a schematic diagram of an implementation process of a processing method of a network side in some embodiments of the present disclosure, as is shown in the figure, including:

step 401: receiving UE information reported by a UE, the UE information includes one or a combination of following information: secondary node information, secondary cell information, beam information, cell-level measurement result information, beam-level measurement result information, historical information of the UE in an inactive state;

step 402: determining state of the UE according to the UE information

In the embodiments of the present disclosure, state of the UE refers to past and/or present state of the UE, such as position of the UE, directions of motion of the UE, path of the UE, etc.

Specifically, information related to nodes and cells can provide paths information, information related to beams can provide direction information of a cell and more specific path information. The UE information can also be classified to position information, as all of them can indicate positions of cell-level, directions of beam-level in cells, velocity and directions of motion by calculating, etc. Historical information of the UE in an inactive state can provide moving position information of the UE.

For example: when the UE information includes secondary node information, position of the UE can be determined according to the secondary node information; when the UE information includes secondary cell information, position of the UE can be determined according to the secondary cell information; when the UE information includes beam information, directions of motion of the UE can be determined according to beam information; when the UE information includes the cell-level measurement result information, path information of the UE can be determined according to the cell-level measurement result information; when the UE information includes beam-level measurement result information, path information of the UE can be determined according to the beam-level measurement result information; when the UE information includes historical information of the UE in an inactive state, moving information of the UE can be determined according to historical information of the UE in an inactive state.

Specifically, UE historical information recorded and reported by the UE includes at least one of following information:
  secondary node information, including a secondary node identifier and/or UE access time;
  secondary cell information, including secondary cell identifier of primary node/secondary node and access time, etc.

Beam information, including beam identifier used by the UE in primary/secondary cell of primary/secondary node, access time, etc.

Cell-level/beam-level measurement result information recorded by the UE, etc;
  historical information of the UE in an inactive state.

The specific embodiments of the present disclosure will be described below with reference to the embodiments.

1. A User Equipment side records secondary node information.

In the embodiments of the present disclosure, the secondary node information includes secondary node identifier and/or UE access time.

In the embodiments of the present disclosure, the secondary node identifier is an identifier of a Primary Secondary Cell (PSCell) which the secondary node accesses to for the UE.

In the embodiments of the present disclosure, the Primary Secondary Cell (PSCell) identifier is CGI or frequency point+PCI.

Embodiment 1

Figure 5:
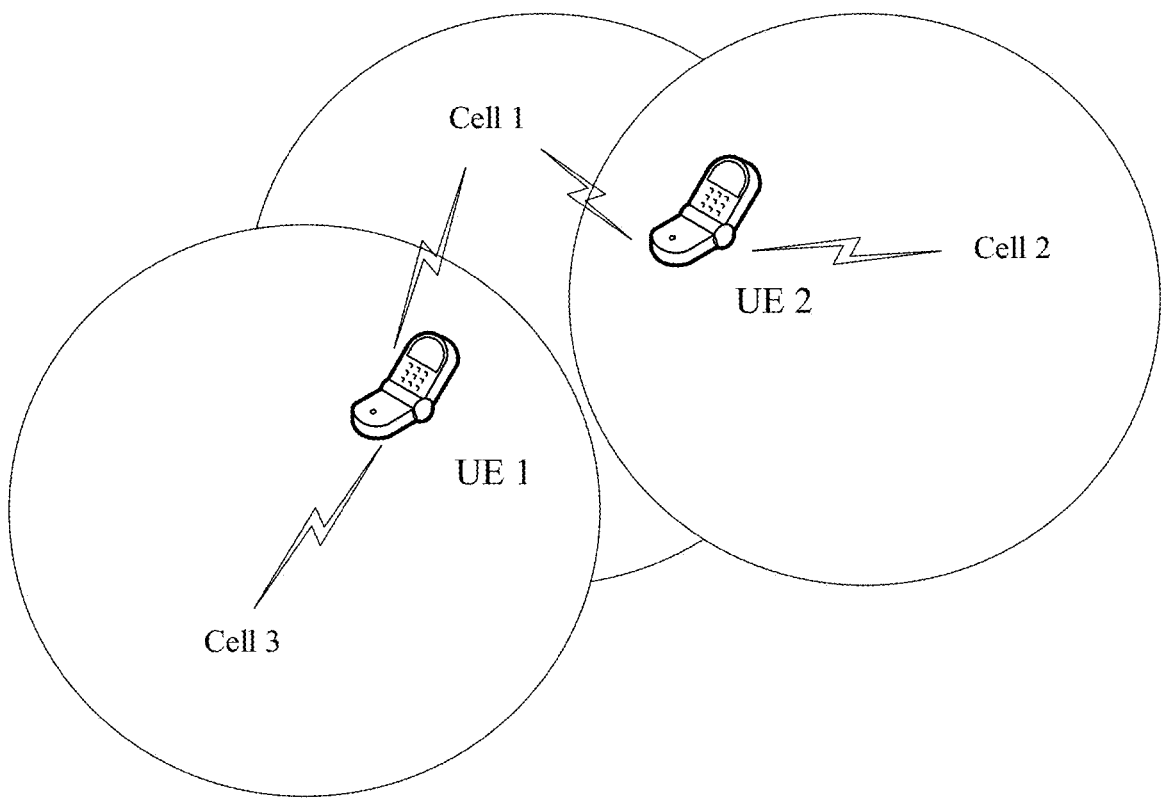
FIG. 5 is a schematic diagram of a UE of Multiple/Dual connection structure in some embodiments of the present disclosure.

FIG. 5 is a schematic diagram of a UE of Multiple/Dual connection structure, as is shown in the figure, a UE connects with a MN and a SN at the same time in multiple/dual connection structure. As is shown in the figure, assuming that main cell of both of UE1 and UE2 is Cell1. UE1 is covered by Cell1 and Cell3 jointly, UE1 can establish dual connection with (base station of) Cell1 and Cell3; UE2 is covered by Cell1 and Cell2 jointly, UE2 can establish dual connection with (base station of) Cell1 and Cell2.

UE historical information of LTE only includes information of primary serving cell, Secondary node, including secondary node identifier, access time and etc. The secondary node identifier can be an identifier of a Primary Secondary Cell (PSCell) which the secondary node accesses to by the UE, further, the secondary node identifier can be CGI or frequency point+PCI form.

If secondary node information is introduced, more detailed position information of UE1 and UE2 can be distinguished according to the coverage range of secondary nodes, providing assistance for a network side to determine path/velocity of the UE or for a SN node to provide judging basis of historical information for the subsequent cell selection under SN of the UE.

2. A User Equipment side records secondary cell information,

In the embodiments of the present disclosure, the secondary cell information includes cell identifier and/or UE access time In the embodiments of the present disclosure, the secondary cell identifier are frequency point which the secondary cell accesses to +PCI.

Embodiment 2

A UE of a CA structure can transmit and receive data from multiple cells, cells having control plane signaling connection with the UE are primary cells, others which are only used for transmitting and receiving data to improve throughput and peak rate of the UE are called secondary cells.

Primary cells and secondary cells can be located in the same node, or different nodes. Even if primary cells and secondary cells belong to the same base station, a Radio Frequency (RF) unit deployment in secondary cells can be different from a RF unit of primary cells in geographical location, which is called RF remote.

Therefore, UE can reports records related to secondary cells including cell identifier and access time according to records of UE historical information, configured to assist a network side to determine path or velocity or other information of the UE. The secondary cell identifier can be CGI or frequency point+PCI form.

Further, the UE can records and reports for secondary cells of a MN and/or SN node based on multiple connection, If secondary cell information is introduced, more detailed position information of UE1 and UE2 can be distinguished according to the coverage range of secondary cells, so as to provide assistance for a network side to determine path/velocity of the UE or for a MN/SN node to provide judging basis of historical information for the subsequent secondary cell selection under MN/SN of the UE.

3. A User Equipment side records beam information,

In the embodiments of the present disclosure, when the UE is in a connected state, connected with a NR node, and there are beams divisions in corresponding cells, the recorded beam information is beam information of primary cell and/or secondary cell of MN, and/or, beam information of primary cell and/or secondary cell of SN; or, when UE is in an idle state or inactive state, camping on a NR cell, and there are beams divisions in the cell, the recorded beam information is beam information of the cell which the UE camps on.

In the embodiments of the present disclosure, the beam information includes one or a combination of following information: beams index, time of accessing to each beam for the UE, time of camping on each beam for the UE.

Embodiment 3

NR systems introduce beam base on cells. A cell can use different amounts of beam information depending on its frequency location and actual service situation. The beam information is related to direction and the coverage of adjacent beams may partially overlap. Upper cell-level records, the UE also records information related to directions of beams including beam index and related time of accessing to beams for the UE/related time of camping on beams for the UE.

For example, beam-related information can be recorded as follows:

1) a beam which the UE accesses to/camp on when the UE enters to current cell, time of the UE being located in the beam can also be recorded; or,
2) all beam which the UE accesses to/camp on when the UE enters to current cell, sum of time of the UE being located in each beam can also be recorded; or,
3) the UE records information of all beams the UE has passed by, time of the UE accessing to/camping on each beam can also be recorded.

When the UE is in a connected state, connected with a NR node, and there are beam divisions in corresponding cells, the recorded beam information is beam information of primary cell and/or secondary cell of MN and/or SN. For example, if a SN node configures bean divisions, then UE of EN-DC scenario can record beam-related information such as SSB identifier, etc according to each serving cell of a SN node.

When UE is in an idle state or inactive state, camping on a NR cell, and there are beams divisions in the cell, the recorded beam information is beam information of the cell which the UE camps on.

4. Implementation of recording measurement results information by a user equipment In the embodiments of the present disclosure, the cell-level measurement result information includes one or a combination of following information:

cell identifier, UE access time, camping time of the UE, the optimal measurement result during access of the UE, the optimal measurement result during camping of the UE, time when the optimal measurement result appears during access of the UE, time when the optimal measurement result appears during camping of the UE.

In the embodiments of the present disclosure, the beam-level measurement result information includes one or a combination of following information:

cell identifier, beam identifier, time of accessing to beams for the UE, time of camping on beams for the UE, the optimal measurement result during accessing to beams for the UE, the optimal measurement result during camping on beams for the UE, time when the optimal measurement result appears during accessing to beams for the UE, time when the optimal measurement result appears during camping on beams for the UE.

Embodiment 4

Historical information recorded by a UE only includes cell information and excludes measurement results related information during the time when the UE accesses to/camps on the cell, when the UE is in different positions, the measurement results of the cell will change. If UE not only records cell identifier and access/camping time, but also records optimal measurement results during the access/camping period, it can help a network side to further determine geographical location when UE is closest to the cell center, and then assist in determining the path information of UE.

1) For all cell-level UE historical records, UE can record optimal value of all measurement results of the measured serving cell:

measurement results of RSRP (Reference Signal Received Power) and/or RSRQ (Reference Signal Received Quality) are possible;

time that the optimal value appears is, such as, relative time information after the UE accesses to/camps on the cell, hold time that UE keeping at the optimal value.

2) For all historical records of beam-level, the UE can record optimal value of all measurement results of the measured beam, measurement results of RSRP and/or RSRQ are possible;

time that the optimal value appears is, such as, relative time information after the UE accesses to/camps on the beam, hold time that UE keeping at the optimal value.

5. Implementation of recording historical information of the UE in an inactive state.

In the embodiments of the present disclosure, historical information of the UE in an inactive state is behavior information of the UE in an inactive state.

Embodiment 5

In LTE systems, a UE can records historical information for the UE in an idle state or connected state, NR systems introduce a inactive state of RRC. Behaviors of measurement and evaluation of cell reselection when UE is in an inactive state is basically consistent with that in an idle state. The UE also need to record historical information of the UE in an inactive state for continuity of UE historical information.

Based on the same invention concept, some embodiments of the present disclosure also provide a base station, a User Equipment, a device for reporting UE information, a processing apparatus for UE information, and a computer-readable storage medium. since the principle of solving the problems by these devices is similar to the method for reporting UE information and the method for processing UE information, therefore, the implementation of these devices can refer to the implementation of the methods, and the repetition will not be provided.

When implementing the technical solutions provided by some embodiments of the present disclosure, they can be implemented as follows.

Figure 6:
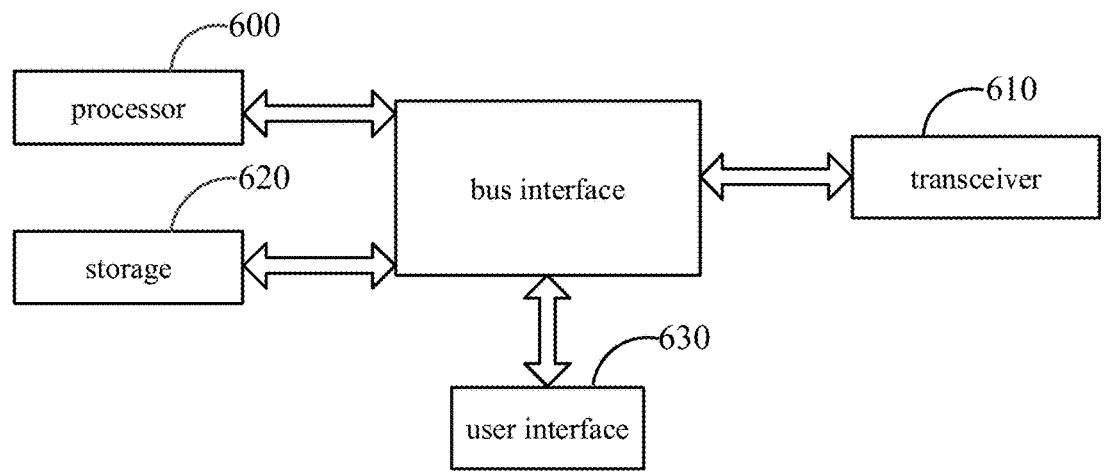
FIG. 6 is a schematic diagram of a structure of a UE in some embodiments of the present disclosure.

FIG. 6 is a schematic diagram of a structure of a UE, as is shown in the figure, the UE includes:

A processor 600, configured to read a program in a storage 620, and implements the following processes:

recording UE information, and the UE information includes one or a combination of following information: secondary node information, secondary cell information, beam information, cell-level measurement result information, beam-level measurement result information, historical information of the UE in an inactive state;

a transceiver 610, configured to receive and transmit data controlled by processor, implementing following process:

reporting the UE information.

In the embodiments of the present disclosure, the secondary node information includes a secondary node identifier and/or UE access time.

In the embodiments of the present disclosure, the secondary node identifier is an identifier of a Primary Secondary Cell (PSCell) which the secondary node accesses to by the UE.

In the embodiments of the present disclosure, the Primary Secondary Cell (PSCell) identifier is CGI or frequency point+PCI.

In the embodiments of the present disclosure, the secondary cell information includes cell identifier and/or UE access time.

In the embodiments of the present disclosure, the secondary cell identifier are the frequency point+PCI.

In the embodiments of the present disclosure, when the UE is in a connected state, connected with a NR node, and there are beams divisions in corresponding cells, the recorded beam information is beam information of primary cell and/or secondary cell of MN, and/or, beam information of primary cell and/or secondary cell of SN; or, when UE is in an idle state or inactive state, camping on a NR cell, and there are beams divisions in the cell, the recorded beam information is beam information of the cell the UE camping on.

In the embodiments of the present disclosure, the beam information includes one or a combination of following information: beams index, time of accessing to each beam for the UE, time of camping on each beam for the UE.

In the embodiments of the present disclosure, the cell-level measurement result information includes one or a combination of following information:

cell identifier, UE access time, camping time of the UE, the optimal measurement result during access of the UE, the optimal measurement result during camping of the UE, time when the optimal measurement result appears during access of the UE, time when the optimal measurement result appears during camping of the UE.

In the embodiments of the present disclosure, the beam-level measurement result information includes one or a combination of following information:

cell identifier, beam identifier, time of accessing to beams for the UE, time of camping on beams for the UE, the optimal measurement result during accessing to beams for the UE, the optimal measurement result during camping on beams for the UE, time when the optimal measurement result appears during accessing to beams for the UE, time when the optimal measurement result appears during camping on beams for the UE.

In the embodiments of the present disclosure, historical information of the UE in an inactive state is behavior information of the UE in an inactive state.

In FIG. 6, a bus architecture may include any number of interconnected buses and bridges. Specifically, various circuits such as one or more processors represented by the processor 600 and a memory represented by the storage 620 are linked together. The bus architecture can also link various other circuits such as peripherals, voltage regulators, power management circuits, etc., which are all known in the art, and therefore, will not be further described herein. The bus interface provides the interface. The transceiver 610 may be a plurality of elements, including a transmitter and a transceiver, and provide a unit for communicating with various other devices on a transmission medium. For different User Equipment, a user interface 630 may also be an interface capable of connecting externally and internally with a required device. The connected equipment includes, but is not limited to, a keypad, a display, a speaker, a microphone, a joystick, and the like.

The processor 600 is responsible for managing the bus architecture and general processing, and the storage 620 can store data used by the processor 600 when performing operations.

Figure 7:
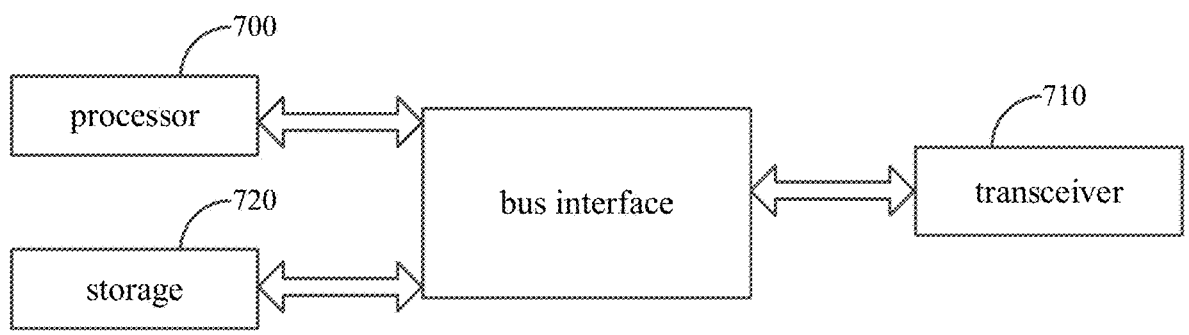
FIG. 7 is a schematic diagram of a structure of a base station in some embodiments of the present disclosure

FIG. 7 is a schematic diagram of a structure of a base station, as is shown in the figure, a base station includes:

a processor 700, configured to read a program in a storage 720, and implements the following processes:

determining state of UE according to the UE information;

a transceiver 710, configured to receive and transmit data controlled by a processor 700, implementing following process:

receiving UE information reported by a UE, the UE information includes one or a combination of following information: secondary node information, secondary cell information, beam information, cell-level measurement result information, beam-level measurement result information, historical information of the UE in an inactive state;

In the embodiments of the present disclosure, the secondary node information includes a secondary node identifier and/or UE access time.

In the embodiments of the present disclosure, the secondary node identifier is an identifier of a Primary Secondary Cell (PSCell) which the secondary node accesses to for the UE.

In the embodiments of the present disclosure, the Primary Secondary Cell (PSCell) identifier is CGI or frequency point+PCI.

In the embodiments of the present disclosure, the secondary cell information includes cell identifier and/or UE access time.

In the embodiments of the present disclosure, the secondary cell identifier are frequency point which the secondary cell accesses to +PCI.

In the embodiments of the present disclosure, when the UE is in a connected state, connected with a NR node, and there are beams divisions in corresponding cells, the recorded beam information is beam information of primary cell and/or secondary cell of MN, and/or, beam information of primary cell and/or secondary cell of SN; or, when UE is in an idle state or inactive state, camping on a NR cell, and there are beams divisions in the cell, the recorded beam information is beam information of the cell which the UE camps on.

In the embodiments of the present disclosure, the beam information includes one or a combination of following information: beams index, time of accessing to each beam for the UE, time of camping on each beam for the UE.

In the embodiments of the present disclosure, the cell-level measurement result information includes one or a combination of following information:

cell identifier, UE access time, camping time of the UE, the optimal measurement result during access of the UE, the optimal measurement result during camping of the UE, time when the optimal measurement result appears during access of the UE, time when the optimal measurement result appears during camping of the UE.

In the embodiments of the present disclosure, the beam-level measurement result information includes one or a combination of following information:

cell identifier, beam identifier, time of accessing to beams for the UE, time of camping on beams for the UE, the optimal measurement result during accessing to beams for the UE, the optimal measurement result during camping on beams for the UE, time when the optimal measurement result appears during accessing to beams for the UE, time when the optimal measurement result appears during camping on beams for the UE.

In the embodiments of the present disclosure, historical information of the UE in an inactive state is behavior information of the UE in an inactive state.

In FIG. 7, a bus architecture may include any number of interconnected buses and bridges. Specifically, various circuits such as one or more processors represented by the processor 600 and a memory represented by the storage 620 are linked together. The bus architecture can also link various other circuits such as peripherals, voltage regulators, power management circuits, etc., which are all known in the art, and therefore, will not be further described herein. The bus interface provides the interface. The transceiver 710 may be a plurality of elements, including a transmitter and a transceiver, and provide a unit for communicating with various other devices on a transmission medium. The processor 700 is responsible for managing the bus architecture and general processing, and the storage 720 can store data used by the processor 700 when performing operations.

Some embodiments of the present disclosure provides a device for reporting UE information. The reporting apparatus includes following:
  a recording module, configured to record UE information, and the UE information includes one or a combination of following information: secondary node information, secondary cell information, beam information, cell-level measurement result information, beam-level measurement result information, historical information of the UE in an inactive state;
  a reporting module, configured to report the UE information.

Details of the above method for reporting UE information may be referred to.

Some embodiments of the present disclosure provides a processing apparatus for UE information. The processing apparatus includes following:
  a receiving module, configured to receive UE information reported by a UE, the UE information includes one or a combination of following information: secondary node information, secondary cell information, beam information, cell-level measurement result information, beam-level measurement result information, historical information of the UE in an inactive state;
  a determining module, configured to determine state of the UE according to the UE information.

Details of the above method for processing UE information may be referred to.

For the convenience of description, each part of the above-mentioned device is divided into various modules or units according to functions and described separately. Of course, when implementing the present disclosure, the functions of each module or unit can be implemented in the same or multiple software or hardware.

Some embodiments of the present disclosure provides a computer-readable storage medium for UE information, wherein the computer-readable storage medium stores a computer program for implementing the above methods of reporting/processing UE information.

Details of the above reporting and/or method for processing UE information may be referred to.

In summary, some embodiments of the present disclosure provided a solution that expanding contents of UE historical record information and recording and reporting of historical information of UE in an inactive state.

Specifically, UE historical information recorded and reported by a UE includes at least one of following information:
  secondary node information, including a secondary node identifier and/or UE access time;
  secondary cell information, including secondary cell identifier of primary node/secondary node and access time, etc.

Beam information, including beam identifier used by a UE in primary/secondary cell of primary/secondary node, access time, etc.

Cell-level/beam-level measurement result information recorded by the UE, etc;
  historical information of the UE in an inactive state.
  since UE information is expanded, so that it assists a network side to determine the path, velocity and geographical locations of UE, or assists a network side to configure secondary nodes and/or secondary cells for a UE according to historical information.

Those skilled in the art should understand that the embodiments of the present disclosure can be provided as a method, a system, or a computer program product. Therefore, the present disclosure may adopt the form of a complete hardware embodiment, a complete software embodiment, or an embodiment combining software and hardware. Moreover, the present disclosure may take the form of a computer program product implemented on one or more computer-usable storage media (including, but being not limited to, a disk storage, an optical storage, etc.) containing computer-usable program codes.

The present disclosure is described with reference to flowcharts and/or block diagrams of methods, devices (systems), and computer program products according to some embodiments of the present disclosure. Each process and/or block in the flowcharts and/or block diagrams, and the combination of processes and/or blocks in the flowchart and/or block diagram can be realized by computer program instructions. These computer program instructions can be provided to a processor of a general-purpose computer, a special-purpose computer, an embedded processor, or other programmable data processing devices to generate a machine, so that the instructions executed by the processor of the computer or other programmable data processing devices are configured to generate a device that realizes the functions specified in one or more processes in the flowcharts and/or one or more blocks in the block diagrams.

These computer program instructions can also be stored in a computer-readable memory that can direct a computer or other programmable data processing devices to work in a specific manner, so that the instructions stored in the computer-readable memory produce an article of manufacture including the instruction device. The instruction device implements the functions specified in one or more processes in the flowcharts and/or one or more blocks in the block diagram.

These computer program instructions can also be loaded on a computer or other programmable data processing devices, so that a series of operation steps are executed on the computer or other programmable devices to produce computer-implemented processing. Therefore, instructions executed on the computer or other programmable devices provide steps for implementing functions specified in one or more processes in the flowcharts and/or one or more blocks in the block diagrams.

It can be understood that the embodiments described in the embodiments of the present disclosure may be implemented by hardware, software, firmware, middleware, microcode, or a combination thereof. For hardware implementation, modules, units, sub-modules, sub-units, etc. can be implemented in one or more application specific integrated circuits (ASIC), digital signal processors (Digital Signal Processing, DSP), digital signal processing device (DSP Device, DSPD), Programmable Logic Device (PLD), Field-Programmable Gate Array (Field-Programmable Gate Array, FPGA), general-purpose processors, controllers, microcontrollers, microprocessors, other electronic units or combinations thereof that perform the functions described in the present disclosure.

For software implementation, the technology described in the embodiments of the present disclosure can be implemented by modules (for example, procedures, functions, etc.) that perform the functions described in the embodiments of the present disclosure. Software codes can be stored in the memory and executed by the processor. The memory can be implemented in the processor or external to the processor.

Obviously, those skilled in the art can make various changes and modifications to the present disclosure without departing from the spirit and the scope of the present disclosure. In this way, if these changes and modifications of the present disclosure fall within the scopes of the claims of the present disclosure and equivalent technologies, it is also intended that the present disclosure also includes these changes and modifications.

What is claimed is:

1. A method for reporting User Equipment (UE) information, comprising:
   recording, by a UE, UE historical information, wherein the UE historical information comprises: secondary node information and/or secondary cell information, and the UE historical information further comprises at least one of: cell-level measurement result information, beam-level measurement result information, or historical information of the UE in an inactive state;
   reporting the UE information by the UE;
   wherein the secondary node information comprises UE time of connection,
   the secondary cell information comprises UE time of connection;
   wherein the cell-level measurement result information comprises one or a combination of following information:
   an optimal measurement result during connection of the UE, an optimal measurement result during camping of the UE, time when the optimal measurement result appears during connection of the UE, time when the optimal measurement result appears during camping of the UE;
   wherein the beam-level measurement result information comprises one or a combination of following information:
   an optimal measurement result during accessing to beams for the UE, an optimal measurement result during camping on beams for the UE, time when the optimal measurement result appears during accessing to beams for the UE, time when the optimal measurement result appears during camping on beams for the UE.

2. The method according to claim 1, wherein the secondary node information further comprises a secondary node identifier;
   wherein the secondary node identifier is an identifier of a Primary Secondary Cell (PSCell) which the secondary node accesses to for the UE;
   wherein the PSCell identifier is a Cell Global Identifier (CGI) or a frequency point+Physical Cell Identifier (PCI).

3. The method according to claim 1, wherein the secondary cell information further comprises a cell identifier;
   wherein the secondary cell identifier is a frequency point which the secondary cell accesses to +PCI.

4. The method according to claim 1, wherein the UE historical information further comprises beam information, when a UE is in a connected state and connected to a NR node, and there are beams divisions in corresponding cells, the recorded beam information is beam information of a primary cell and/or a secondary cell of a master node (MN), and/or, beam information of a primary cell and/or a secondary cell of a secondary node (SN); or,
   when UE is in an idle state or inactive state, camping on a NR cell, and there are beams divisions in the cell, the recorded beam information is beam information of a cell which the UE camps on;
   wherein the beam information comprises one or a combination of following information: beams index, time of accessing to each beam for the UE, time of camping on each beam for the UE.

5. The method according to claim 1, wherein the cell-level measurement result information further comprises one or a combination of following information:
   a cell identifier, UE time of connection, camping time of the UE.

6. The method according to claim 1, wherein the beam-level measurement result information further comprises one or a combination of following information:
   a cell identifier, a beam identifier, time of accessing to beams for the UE, time of camping on beams for the UE;
   wherein the historical information of the UE in an inactive state is behavior information of the UE in an inactive state.

7. A method for processing User Equipment (UE) information, comprising:
   receiving UE historical information reported by a UE, the UE historical information comprises: secondary node information and/or secondary cell information, and the UE historical information further comprises at least one of: cell-level measurement result information, beam-level measurement result information, or historical information of the UE in an inactive state;
   determining a state of the UE according to the UE information;
   wherein the secondary node information comprises UE time of connection,
   the secondary cell information comprises UE time of connection;
   wherein the cell-level measurement result information comprises one or a combination of following information:
   an optimal measurement result during connection of the UE, an optimal measurement result during camping of the UE, time when the optimal measurement result appears during connection of the UE, time when the optimal measurement result appears during camping of the UE;
   wherein the beam-level measurement result information comprises one or a combination of following information:
   an optimal measurement result during accessing to beams for the UE, an optimal measurement result during camping on beams for the UE, time when the optimal measurement result appears during accessing to beams for the UE, time when the optimal measurement result appears during camping on beams for the UE.

8. The method according to claim 7, wherein the secondary node information further comprises a secondary node identifier.

9. The method according to claim 8, wherein the secondary node identifier is an identifier of a Primary Secondary Cell (PSCell) which the secondary node accesses to for the UE;
wherein the Primary Secondary Cell (PSCell) identifier is a Cell Global Identifier (CGI) or a frequency point+ Physical Cell Identifier (PCI).

10. The method according to claim 9, wherein the UE historical information further comprises beam information, when a UE is in a connected state and connected to a NR node, and there are beams divisions in corresponding cells, the recorded beam information is beam information of primary cell and/or secondary cell of a master node (MN), and/or, beam information of primary cell and/or secondary cell of a secondary node (SN); or,
when UE is in an idle state or inactive state, camping on a NR cell, and there are beams divisions in the cell, the recorded beam information is beam information of the cell which the UE camps on;
wherein the beam information comprises one or a combination of following information: a beams index, time of accessing to each beam for the UE, time of camping on each beam for the UE.

11. The method according to claim 9, wherein the cell-level measurement result information further comprises one or a combination of following information:
a cell identifier, UE time of connection, camping time of the UE.

12. The method according to claim 9, wherein the beam-level measurement result information further comprises one or a combination of following information:
a cell identifier, a beam identifier, time of accessing to beams for the UE, time of camping on beams for the UE;
wherein the historical information of the UE in an inactive state is behavior information of the UE in an inactive state.

13. The method according to claim 7, wherein the secondary cell information further comprises a cell identifier;
wherein the secondary cell identifier is a frequency point which the secondary cell accesses to +PCI.

14. A base station, comprising:
a processor, configured to read programs stored in a memory to perform the method for processing User Equipment (UE) information according to claim 7.

15. A user equipment, comprising:
a processor, configured to read programs stored in a memory to perform:
recording UE historical information, wherein the UE historical information comprises:
secondary node information and/or secondary cell information, and the UE historical information further comprises at least one of: cell-level measurement result information, beam-level measurement result information, or historical information of the UE in an inactive state;
a transceiver, configured to receive and transmit data controlled by the processor to perform:
reporting the UE information;
wherein the secondary node information comprises UE time of connection,
the secondary cell information comprises UE time of connection;
wherein the cell-level measurement result information comprises one or a combination of following information:
an optimal measurement result during connection of the UE, an optimal measurement result during camping of the UE, time when the optimal measurement result appears during connection of the UE, time when the optimal measurement result appears during camping of the UE;
wherein the beam-level measurement result information comprises one or a combination of following information:
an optimal measurement result during accessing to beams for the UE, an optimal measurement result during camping on beams for the UE, time when the optimal measurement result appears during accessing to beams for the UE, time when the optimal measurement result appears during camping on beams for the UE.

16. The user equipment according to claim 15, wherein the secondary node information further comprises a secondary node identifier;
wherein the secondary node identifier is an identifier of a Primary Secondary Cell (PSCell) which the secondary node accesses to by a UE;
wherein the Primary Secondary Cell (PSCell) identifier is a Cell Global Identifier (CGI) or a frequency point+ Physical Cell Identifier (PCI).

17. The user equipment according to claim 15, wherein the secondary cell information further comprises a cell identifier;
wherein the secondary cell identifier is a frequency point which the secondary cell accesses to +PCI.

18. The user equipment according to claim 15, wherein the UE historical information further comprises beam information, when a UE is in a connected state and connected to a NR node, and there are beams divisions in corresponding cells, the recorded beam information is beam information of a primary cell and/or a secondary cell of a master node (MN), and/or, beam information of a primary cell and/or a secondary cell of a secondary node (SN); or,
when UE is in an idle state or inactive state, camping on a NR cell, and there are beams divisions in the cell, the recorded beam information is beam information of a cell which the UE camps on;
wherein the beam information comprises one or a combination of following information: beams index, time of accessing to each beam for the UE, time of camping on each beam for the UE.

19. The user equipment according to claim 15, wherein the cell-level measurement result information further comprises one or a combination of following information:
a cell identifier, UE time of connection, camping time of the UE.

20. The user equipment according to claim 15, wherein the beam-level measurement result information comprises one or a combination of following information:
a cell identifier, a beam identifier, time of accessing to beams for the UE, time of camping on beams for the UE;
wherein historical information of the UE in an inactive state is behavior information of the UE in an inactive state.

* * * * *